(12) United States Patent
Li et al.

(10) Patent No.: US 11,637,583 B2
(45) Date of Patent: Apr. 25, 2023

(54) SYMBOL-GROUP BASED SPREADING SCHEMES

(71) Applicant: ZTE Corporation, Guangdong (CN)

(72) Inventors: Ziyang Li, Guangdong (CN); Li Tian, Guangdong (CN); Wei Cao, Guangdong (CN); Nan Zhang, Guangdong (CN); Zhifeng Yuan, Guangdong (CN)

(73) Assignee: ZTE Corporation, Guangdong (CN)

( * ) Notice: Subject to any disclaimer, the term of this patent is extended or adjusted under 35 U.S.C. 154(b) by 75 days.

(21) Appl. No.: 17/306,609

(22) Filed: May 3, 2021

(65) Prior Publication Data
US 2021/0281288 A1    Sep. 9, 2021

Related U.S. Application Data

(63) Continuation of application No. PCT/CN2018/114787, filed on Nov. 9, 2018.

(51) Int. Cl.
*H04B 1/7073* (2011.01)
*H04L 5/02* (2006.01)
(Continued)

(52) U.S. Cl.
CPC ...... *H04B 1/70735* (2013.01); *H04J 13/0059* (2013.01); *H04L 1/0003* (2013.01); *H04L 5/026* (2013.01); *H04B 2001/70706* (2013.01)

(58) Field of Classification Search
CPC .... H04L 1/0003; H04L 5/026; H04J 13/0055; H04J 13/0059
(Continued)

(56) References Cited

U.S. PATENT DOCUMENTS

| 10,567,033 B2 | 2/2020 | Kang et al. |
| 10,651,887 B2 | 5/2020 | Yuan et al. |

(Continued)

FOREIGN PATENT DOCUMENTS

| CN | 101340273 A | 1/2009 |
| CN | 105591994 A | 5/2016 |

(Continued)

OTHER PUBLICATIONS

International Search Report and Written Opinion dated Aug. 1, 2019 for International Application No. PCT/CN2018/114787, filed on Nov. 9, 2018 (7 pages).

(Continued)

*Primary Examiner* — Young T. Tse
(74) *Attorney, Agent, or Firm* — Perkins Coie LLP

(57) ABSTRACT

Methods, systems, and devices for the design of symbol-group based spreading schemes are described. An exemplary method for wireless communication includes transmitting, by a terminal, a first spread signal that is generated by spreading a first group of N data symbols using a first set of N sequences, where N is a symbol-group length, L is a spreading length, each of the first set of N sequences is from an orthogonal spreading sequence set that comprises L sequences, and each of the L sequences is of length L. Another exemplary method for wireless communication includes transmitting, by a network node, an indication of a first set of N sequences, and receiving a first spread signal comprising a group of N data symbols spread using the first set of N sequences.

20 Claims, 9 Drawing Sheets

700

Transmitting, by a terminal, a first spread signal that is generated by spreading a first group of N data symbols using a first set of N sequences, where N is a symbol-group length, L is a spreading length, each of the first set of N sequences is from an orthogonal spreading sequence set that comprises L sequences, and each of the L sequences is of length L ⟶ 710

(51) Int. Cl.
*H04J 13/00* (2011.01)
*H04B 1/707* (2011.01)
*H04L 1/00* (2006.01)

(58) Field of Classification Search
USPC ........ 375/140, 141, 146; 370/208, 210, 335, 370/337, 342, 347
See application file for complete search history.

(56) References Cited

U.S. PATENT DOCUMENTS

| | | | |
|---|---|---|---|
| 10,826,557 B2 | 11/2020 | Yuan et al. | |
| 2010/0091755 A1* | 4/2010 | Kwon | H04W 72/0413 |
| | | | 370/344 |
| 2018/0077685 A1 | 3/2018 | Wu et al. | |
| 2020/0014506 A1* | 1/2020 | Li | H04L 5/0058 |
| 2020/0221437 A1* | 7/2020 | Yuan | H04L 27/2607 |

FOREIGN PATENT DOCUMENTS

| | | | |
|---|---|---|---|
| CN | 106160827 A | 11/2016 | |
| CN | 107508661 A | 12/2017 | |
| CN | 108206724 A | 6/2018 | |
| WO | 2017/065355 A1 | 4/2017 | |
| WO | 2018/050044 A1 | 3/2018 | |
| WO | 2018/054280 A1 | 3/2018 | |
| WO | 2018/174686 A1 | 9/2018 | |
| WO | 2018/204861 A1 | 11/2018 | |
| WO | WO-2019128432 A1 * | 7/2019 | ............... H04B 1/69 |

OTHER PUBLICATIONS

Li, Tian et al., "On Uplink Non-Orthogonal Multiple Access for 5G: Opportunities and Challenges", China Communications, vol. 14, Issue 12, 142-152 pages, Dec. 31, 2017.
Zte et al., "Transmitter side designs for NOMA," 3GPP TSG RAN WG1 Meeting #95, Spokane, Washington, USA, R1-1812172, 7 pages, Nov. 16, 2018.
Chinese Office Action dated Feb. 25, 2022 for Chinese Patent Application No. 201880098974.4 (24 pages).
Ericsson, "TX schemes for NoMA," 3GPP TSG-RAN WG1 Meeting #94b, Chengdu, China, R1-1811174, 10 pages, Oct. 8-12, 2018.
Ericsson, "Signature Design for NoMA," 3GPP TSG RAN WG1 Meeting #92Bis, Sanya, China, R1-1805003, 7 pages, Apr. 16-20, 2018.
Huawei et al. "Discussion on the design of NOMA transmitter," 3GPP TSG RAN WG1 Meeting #95, Spokane, USA, R1-1812187, 22 pages, Nov. 12-16, 2018.
European Search Report for EP Patent Application No. 18930308.4, dated Oct. 5, 2021, 13 pages.
Mediatek Inc., "New uplink non-orthogonal multiple access schemes for NR," 3GPP TSG RAN WG1 Meeting #86, R1-167535, Gothenburg, Sweden, Aug. 22-26, 2016, 6 pages.
Zte, "Updated text proposal to TR 38.812 (NOMA)," 3GPP TSG RAN WG1 Meeting #94bis, R1-1811976, Chengdu, China, Oct. 8-12, 2018, 50 pages.

* cited by examiner

SYMBOL-GROUP BASED SPREADING SCHEMES

CROSS-REFERENCE TO RELATED APPLICATIONS

This application is a continuation of International Patent Application No. PCT/CN2018/114787, filed on Nov. 9, 2018, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for higher data rates, thereby requiring base stations and user equipment to implement flexible spreading schemes.

SUMMARY

This document relates to methods, systems, and devices for the design of symbol-group based spreading schemes, which advantageously provide flexibility and scalability with regard to generating non-orthogonal multiple access (NOMA) sequences, as well as the ability to control the level of multi-user interference, for mobile communication systems, e.g., Fifth Generation (5G) and New Radio (NR) systems.

In one exemplary aspect, a wireless communication method is disclosed. The method includes transmitting, by a terminal, a first spread signal that is generated by spreading a first group of N data symbols using a first set of N sequences, where N is a symbol-group length, L is a spreading length, each of the first set of N sequences is from an orthogonal spreading sequence set that comprises L sequences, and each of the L sequences is of length L.

In another exemplary aspect, a wireless communication method is disclosed. The method includes transmitting, by a network node, an indication of a first set of N sequences, where N is a symbol-group length, L is a spreading length, each of the first set of N sequences is from an orthogonal spreading sequence set that comprises L sequences, and each of the L sequences is of length L, and receiving a first spread signal comprising a group of N data symbols spread using the first set of N sequences.

In yet another exemplary aspect, a wireless communication method is disclosed. The method includes transmitting, by a network node, an indication of a first set of N sequences, where N is a symbol-group length, L is a spreading length, each of the first set of N sequences is from an orthogonal spreading sequence set that comprises L sequences, and each of the L sequences is of length L, receiving, over a time and frequency resource and from a first terminal, a first spread signal comprising a first group of N data symbols spread using the first set of N sequences, and receiving, over the time and frequency resource and from a second terminal, a second spread signal comprising a second group of N data symbols spread using a second set of N sequences.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

With the development of the Internet of Things (IoT), a large number of sensor nodes equipped with wireless communication module may need to be served by cellular networks. To support massive connections with high resource efficiency, non-orthogonal multiple access (NOMA) has been proposed in 5G NR as a require component of the technology.

NOMA with symbol-level spreading is a good candidate to accommodate multiple users with shared time-frequency resource. On one hand, a spreading sequence set with low cross-correlation is desirable to alleviate inter-user interference. On the other hand, a large number of sequences are needed to facilitate massive connections. To fulfill these requirements, many UE-specific spreading scheme implementations have been considered by the 5G NOMA program. In each UE-specific scheme, there may be different sequences for different spreading lengths. These sequences are designed based on low cross-correlation criterion, which leads to a similarly good performance in link and system simulations. However, it is difficult to unify these schemes to provide the large number of spreading sequences used in NOMA implementations.

Embodiments of the disclosed technology include a symbol-group based spreading scheme, in which an expanded spreading sequence pattern is obtained using a base orthogonal spreading sequence set (with relatively small size) and the length the of symbol-group.

Figure 1:
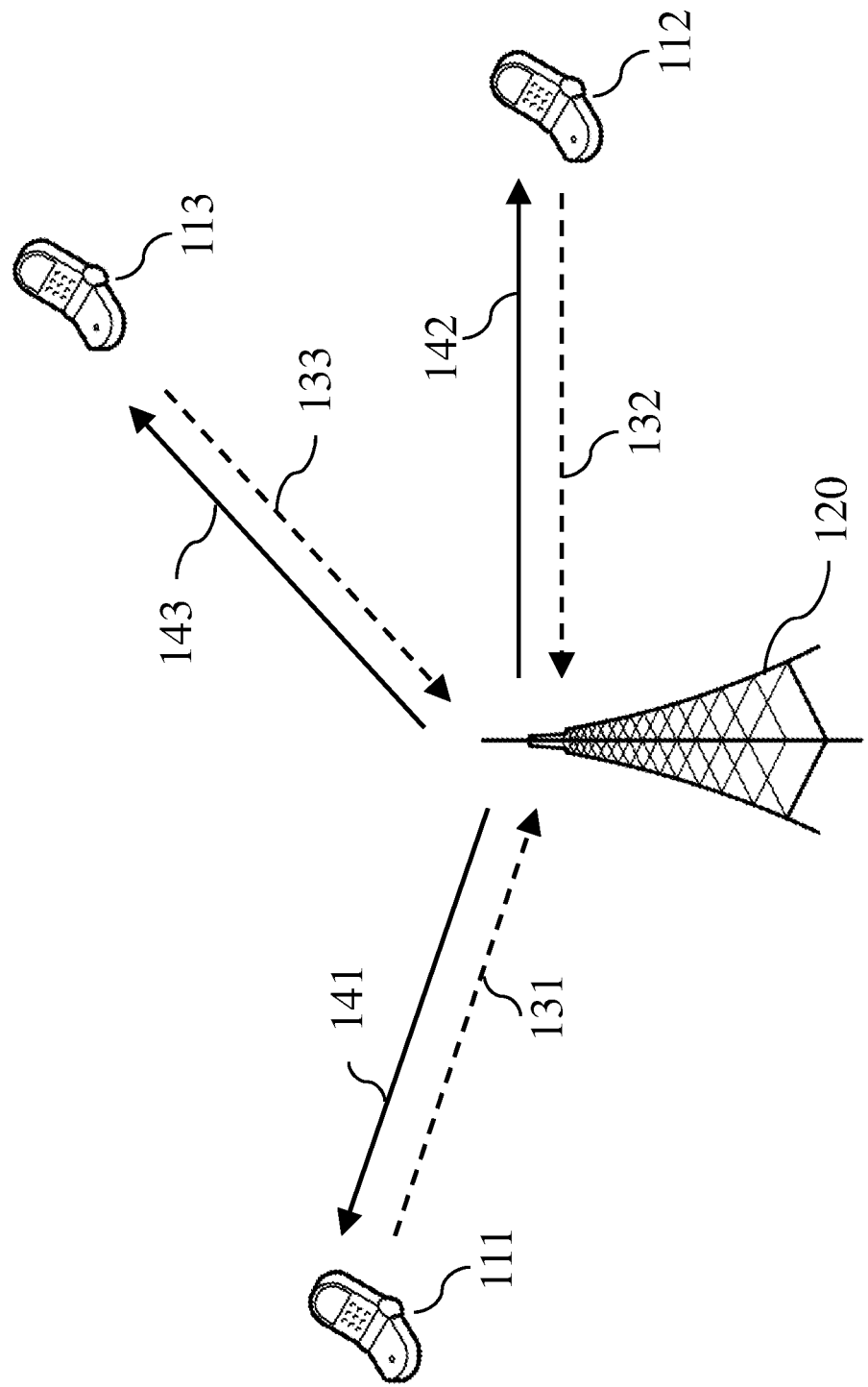
FIG. 1 shows an example of a base station (BS) and user equipment (UE) in wireless communication, in accordance with some embodiments of the presently disclosed technology.

FIG. 1 shows an example of a wireless communication system (e.g., an LTE, 5G or New Radio (NR) cellular network) that includes a BS 120 and one or more user equipment (UE) 111, 112 and 113. In some embodiments, the BS may transmit an indication (141, 142, 143) of which sequences are to be used by each UE, and is followed by simultaneous transmissions (131, 132, 133) from the UEs (and using their designated sequences). The UE may be, for example, a smartphone, a tablet, a mobile computer, a machine to machine (M2M) device, a terminal, a mobile device, an Internet of Things (IoT) device, and so on.

The present document uses section headings and subheadings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Overview of Existing Implementations

Figure 2:
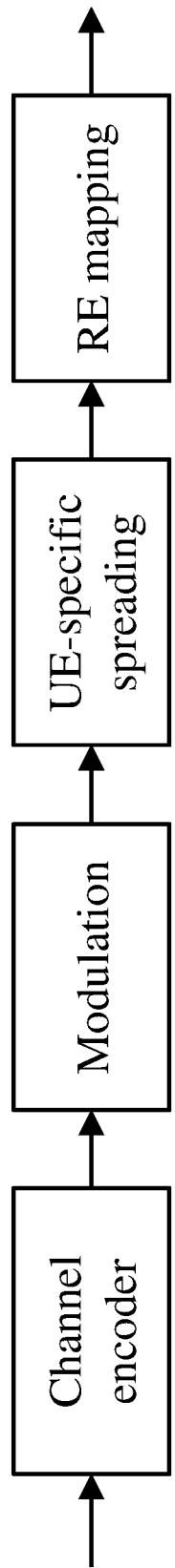
FIG. 2 shows a block diagram of an example transmitter using UE-specific spreading.

In traditional non-orthogonal multiple access schemes using spreading sequences, a UE may usually utilize one specific spreading sequence, which can be called a UE-specific spreading. An exemplary transmitter for UE-specific spreading is shown in FIG. 2, wherein information bits are encoded to generate coded binary bits, which are then mapped to symbols through the modulator, e.g. QPSK or M-QAM. Then the modulated symbols are spread with the length-L spreading sequence before mapping to one or more resource elements (REs).

Figure 4:
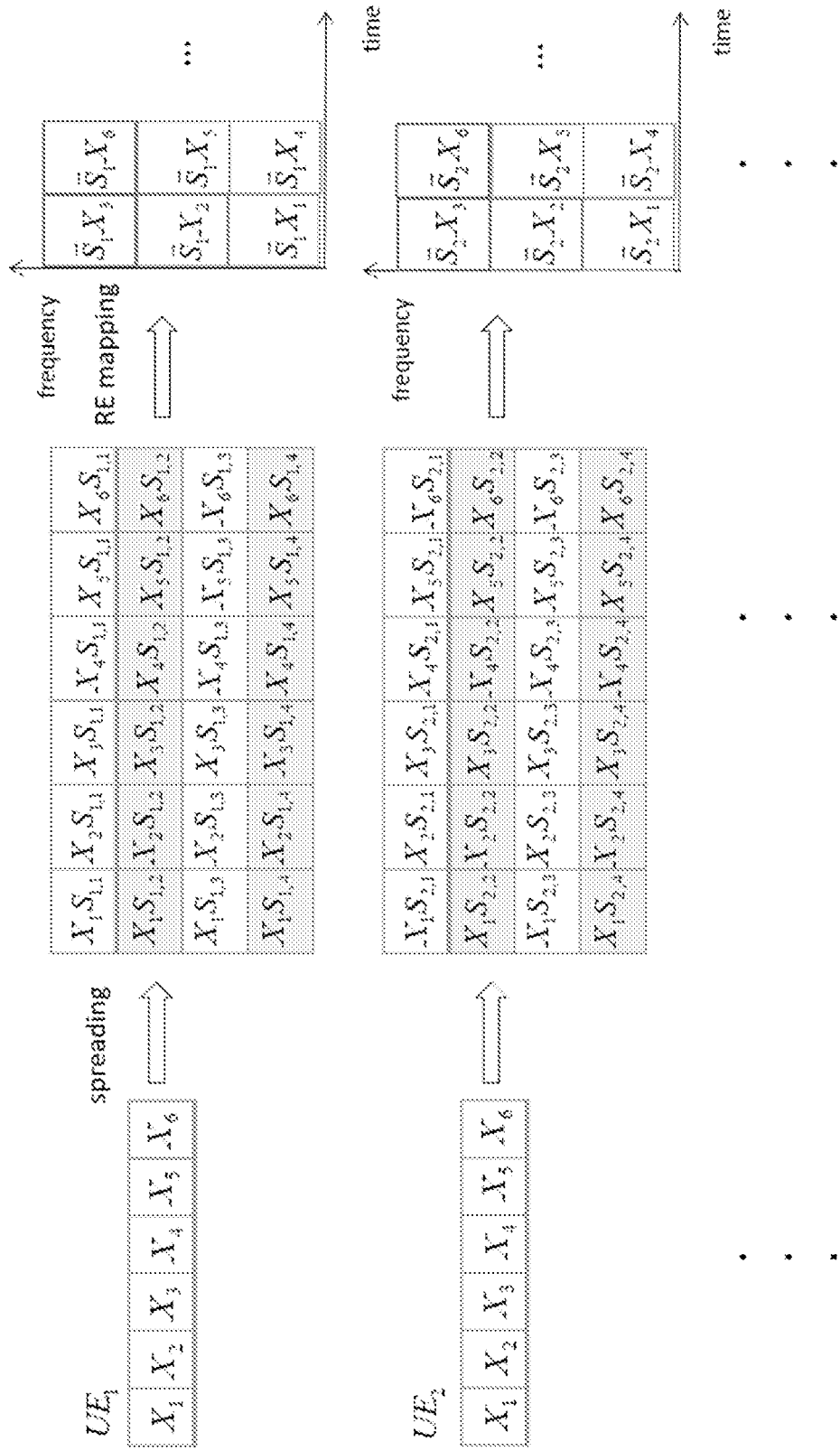
FIG. 4 shows an example of UE-specific spreading.

FIG. 4 shows a specific example of UE-specific spreading, where it is assumed that several UEs {$UE_1, UE_2, \ldots, UE_U$} transmit data using the same time and frequency resource. Each UE chooses a spreading sequence from the set {$\vec{S}_1, \vec{S}_2, \ldots, \vec{S}_U$}, where $\vec{S}_u = [S_{u,1}, S_{u,2}, \ldots, S_{u,SL}]'$, for all its symbols {$X_1, X_2, \ldots, X_{SL}$} to be transmitted. As shown in the example in FIG. 4, the spreading length (SL) is 4, and each UE uses its own chosen spreading sequence to transmit its symbols, thereby resulting in $\vec{S}_1$ and $\vec{S}_2$ being used by $UE_1$ and $UE_2$, respectively, in the same time and frequency resource.

Exemplary Embodiments of the Disclosed Technology

Figure 3:
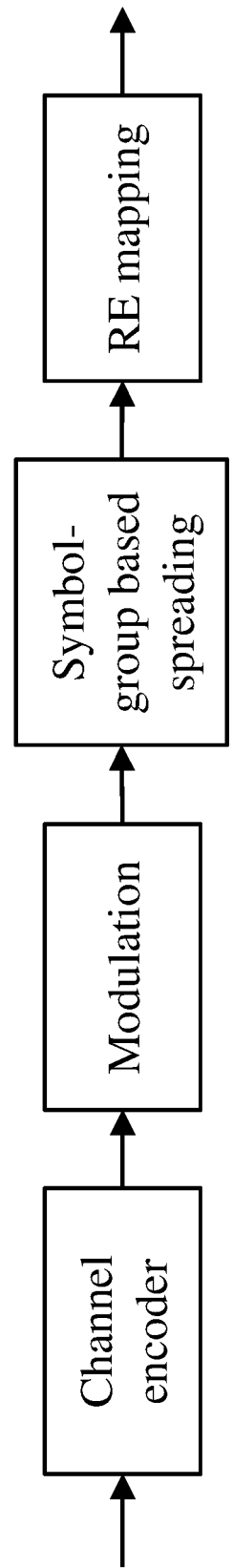
FIG. 3 shows a block diagram of an example transmitter using symbol-group based spreading, in accordance with some embodiments of the presently disclosed technology.

Embodiments of the disclosed technology apply distributed spreading sequences for every N symbols, thereby advantageously enabling the generation of expandable non-orthogonal patterns depending on N, and is termed symbol-group based spreading. An exemplary transmitter for symbol-group based spreading is shown in FIG. 3. As shown therein, information bits are encoded to generate coded binary bits, which are then mapped to symbols through the modulator, e.g. QPSK or M-QAM. Then the modulated symbols are grouped (e.g., into groups of N symbols) and are spread with the length-L spreading sequence before mapping to one or more resource elements (REs).

The spreading length may be denoted as L, and L arbitrary orthogonal sequences may be generated, each with length L elements (or symbols). The L-length orthogonal sequences may be generated by using each column (or row) from an L×L matrix (e.g., a Hadamard matrix or the identity matrix), or by applying L different cyclic shifts on the length-L constant amplitude zero-autocorrelation (CAZAC) sequences. The elements of the L orthogonal sequences are noted as $S_{i,j}$ with $1 \leq i \leq L$ and $1 \leq j \leq L$.

In some embodiments, if different UEs select a unique sequence from the set of L orthogonal sequences, and apply that sequence to all its resources (denoted as symbols in the examples described herein), there will be no interference among UEs. However, the number of orthogonal sequences is limited to L, so in order to extend the scheme to support a greater number of UEs, non-orthogonality among UEs may be introduced.

For example, N symbols may be regarded as a group, and each of the N symbols can select either the same or different orthogonal sequences, so as to extend the orthogonality to non-orthogonality between UEs, e.g., different UEs are orthogonal on some of the symbols, but may collide (use the same sequence) on some other symbols. The total number of possible spreading patterns is $L^N$. In some example, the same non-orthogonal pattern is repeated for different N-symbol groups. It may be noted that if symbol-group length is equal to 1, this case is identical to the UE-specific spreading case described earlier.

Figure 5:
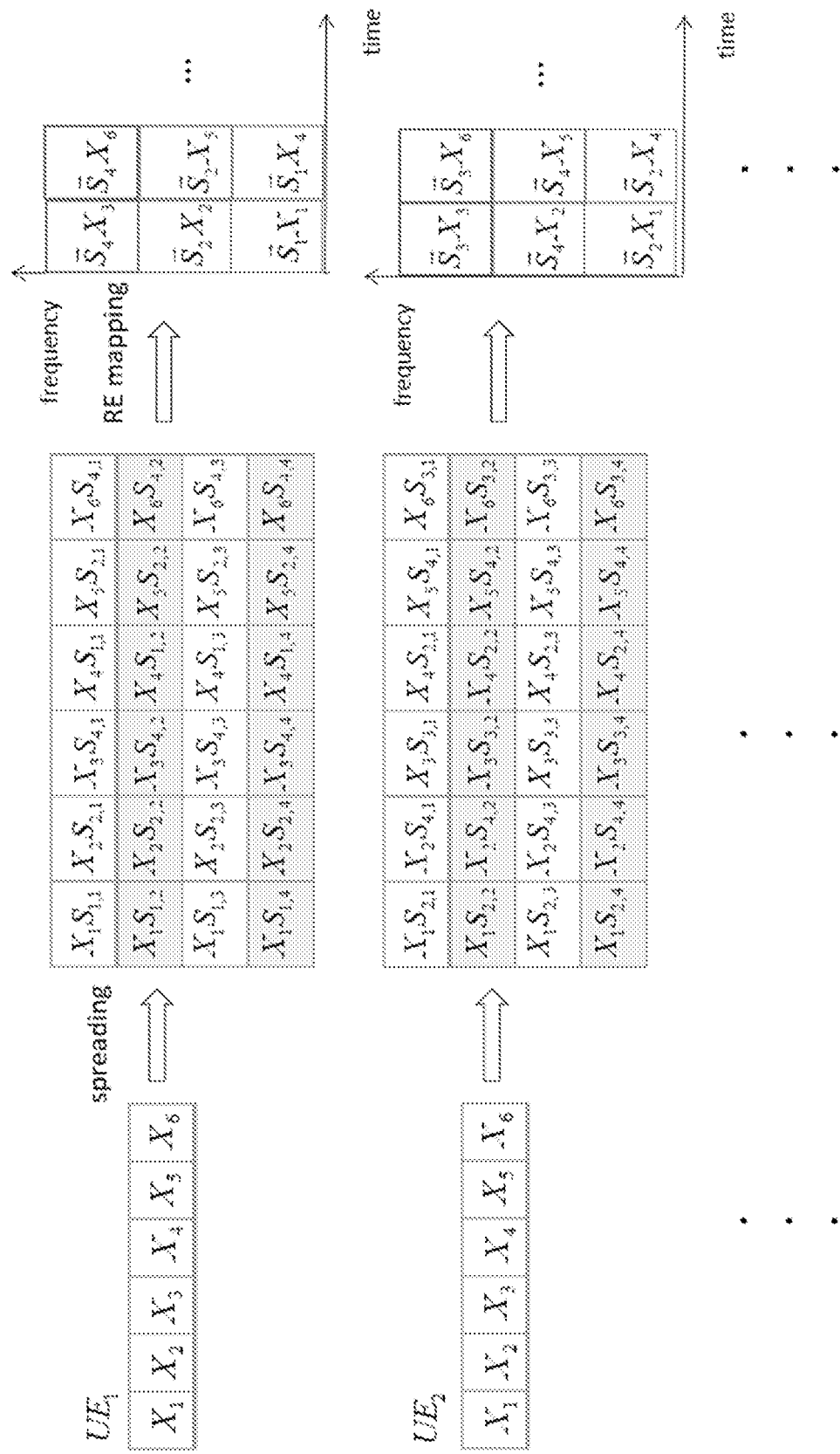
FIG. 5 shows an example of symbol-group based spreading.

FIG. 5 shows a specific example of symbol-group based spreading, where it is assumed that several UEs {$UE_1, UE_2, \ldots, UE_U$} transmit data using the same time and frequency resource. Each UE chooses a non-orthogonal spreading sequence from the set {$\vec{S}_1, \vec{S}_2, \ldots, \vec{S}_U$}, where $\vec{S}_u = [S_{u,1}, S_{u,2}, \ldots, S_{u,SL}]'$. As shown in the example in FIG. 5, the symbol-group length is 3 and the spreading length (SL) is 4. In an example, the spreading patterns selected by UE1 and UE2 are {$\vec{S}_1, \vec{S}_2, \vec{S}_4$} and {$\vec{S}_2, \vec{S}_4, \vec{S}_3$}, respectively. Each UE uses its own selected spreading patterns to transmit its symbols in the same time and frequency resource.

Case 1: Spreading Length=2

In some embodiments, and prior to spreading, two (L=2) arbitrary orthogonal sequences may be generated. In an example, the orthogonal sequences are given by:

| Sequence element, $S_{i,j}$ | j = 1 | j = 2 |
| --- | --- | --- |
| i = 1 | 1 | 1 |
| i = 2 | 1 | −1 |

1) Symbol-Group Length=2

Suppose two symbols $X_1$ and $X_2$ are in a group, and each symbol has two choices for the spreading sequence, [$S_{i1}, S_{i2}$]. Then, after symbol-group spreading, the two symbols become 2×2 symbols, $X_1 S_{i1,1}, X_1 S_{i1,2}, X_2 S_{i2,1}, X_2 S_{i2,2}$, and the total number of spreading sequence patterns is 2^2=4. In an example, the spreading sequence patterns are given by:

| Pattern index | Symbol 1 sequence elements | | Symbol 2 sequence elements | |
| --- | --- | --- | --- | --- |
| 1 | 1 | 1 | 1 | 1 |
| 2 | 1 | 1 | 1 | −1 |
| 3 | 1 | −1 | 1 | 1 |
| 4 | 1 | −1 | 1 | −1 |

2) Symbol-Group Length=3

Suppose three symbols $X_1$, $X_2$ and $X_3$ are in a group, and each symbol has two choices for the spreading sequence, [$S_{i1}, S_{i2}, S_{i3}$]. Then, after symbol-group spreading, the three symbols become 3×2 symbols, $X_1S_{i1,1}$, $X_1S_{i1,2}$, $X_2S_{i2,1}$, $X_2S_{i2,2}$, $X_3S_{i3,1}$, $X_3S_{i3,2}$, and the total number of spreading sequence patterns is $2^3=8$.

3) Symbol-Group Length=4

Suppose four symbols $X_1$, $X_2$, $X_3$ and $X_4$ are in a group, and each symbol has two choices for the spreading sequence, $[S_{i1}, S_{i2}, S_{i3}, S_{i4}]$. Then, after symbol-group spreading, the four symbols become 4×2 symbols, $X_1S_{i1,1}$, $X_1S_{i1,2}$, $X_2S_{i2,1}$, $X_2S_{i2,2}$, $X_3S_{i3,1}$, $X_3S_{i3,2}$, $X_4S_{i4,1}$, $X_4S_{i4,2}$, and the total number of spreading sequence patterns is $2^4=16$.

Case 2: Spreading Length=3

In some embodiments, and prior to spreading, three (L=3) arbitrary orthogonal sequences may be generated. In an example, the orthogonal sequences are given by:

| Sequence element, $S_{i,j}$ | j = 1 | j = 2 | j = 3 |
|---|---|---|---|
| i = 1 | 1 | 0 | 0 |
| i = 2 | 0 | 1 | 0 |
| i = 3 | 0 | 0 | 1 |

1) Symbol-Group Length=2

Suppose two symbols $X_1$ and $X_2$ are in a group, and each symbol has three choices for the spreading sequence, $[S_{i1}, S_{i2}]$. Then, after symbol-group spreading, the two symbols become 2×3 symbols, $X_1S_{i1,1}$, $X_1S_{i1,2}$, $X_1S_{i1,3}$, $X_2S_{i2,2}$, $X_2S_{i2,3}$, and the total number of spreading sequence patterns is $3^2=9$.

2) Symbol-Group Length=3

Suppose three symbols $X_1$, $X_2$ and $X_3$ are in a group, and each symbol has three choices for the spreading sequence, $[S_{i1}, S_{i2}, S_{i3}]$. Then, after symbol-group spreading, the three symbols become 3×3 symbols, $X_1S_{i1,1}$, $X_1S_{i1,2}$, $X_1S_{i1,3}$, $X_2S_{i2,2}$, $X_2S_{i2,3}$, $X_3S_{i3,1}$, $X_3S_{i3,2}$, $X_3S_{i3,3}$, and the total number of spreading sequence patterns is $3^9=27$. In an example, the spreading sequence patterns are given by:

| Pattern index | Symbol 1 sequence elements | | | Symbol 2 sequence elements | | | Symbol 3 sequence elements | | |
|---|---|---|---|---|---|---|---|---|---|
| 1 | 1 | 0 | 0 | 1 | 0 | 0 | 1 | 0 | 0 |
| 2 | 1 | 0 | 0 | 1 | 0 | 0 | 0 | 1 | 0 |
| 3 | 1 | 0 | 0 | 1 | 0 | 0 | 0 | 0 | 1 |
| 4 | 1 | 0 | 0 | 0 | 1 | 0 | 1 | 0 | 0 |
| 5 | 1 | 0 | 0 | 0 | 1 | 0 | 0 | 1 | 0 |
| 6 | 1 | 0 | 0 | 0 | 1 | 0 | 0 | 0 | 1 |
| 7 | 1 | 0 | 0 | 0 | 0 | 1 | 1 | 0 | 0 |
| 8 | 1 | 0 | 0 | 0 | 0 | 1 | 0 | 1 | 0 |
| 9 | 1 | 0 | 0 | 0 | 0 | 1 | 0 | 0 | 1 |
| 10 | 0 | 1 | 0 | 1 | 0 | 0 | 1 | 0 | 0 |
| 11 | 0 | 1 | 0 | 1 | 0 | 0 | 0 | 1 | 0 |
| 12 | 0 | 1 | 0 | 1 | 0 | 0 | 0 | 0 | 1 |
| 13 | 0 | 1 | 0 | 0 | 1 | 0 | 1 | 0 | 0 |
| 14 | 0 | 1 | 0 | 0 | 1 | 0 | 0 | 1 | 0 |
| 15 | 0 | 1 | 0 | 0 | 1 | 0 | 0 | 0 | 1 |
| 16 | 0 | 1 | 0 | 0 | 0 | 1 | 1 | 0 | 0 |
| 17 | 0 | 1 | 0 | 0 | 0 | 1 | 0 | 1 | 0 |
| 18 | 0 | 1 | 0 | 0 | 0 | 1 | 0 | 0 | 1 |
| 19 | 0 | 0 | 1 | 1 | 0 | 0 | 1 | 0 | 0 |
| 20 | 0 | 0 | 1 | 1 | 0 | 0 | 0 | 1 | 0 |
| 21 | 0 | 0 | 1 | 1 | 0 | 0 | 0 | 0 | 1 |
| 22 | 0 | 0 | 1 | 0 | 1 | 0 | 1 | 0 | 0 |
| 23 | 0 | 0 | 1 | 0 | 1 | 0 | 0 | 1 | 0 |
| 24 | 0 | 0 | 1 | 0 | 1 | 0 | 0 | 0 | 1 |
| 25 | 0 | 0 | 1 | 0 | 0 | 1 | 1 | 0 | 0 |
| 26 | 0 | 0 | 1 | 0 | 0 | 1 | 0 | 1 | 0 |
| 27 | 0 | 0 | 1 | 0 | 0 | 1 | 0 | 0 | 1 |

3) Symbol-Group Length=4

Suppose four symbols $X_1$, $X_2$, $X_3$ and $X_4$ are in a group, and each symbol has three choices for the spreading sequence, $[S_{i1}, S_{i2}, S_{i3}, S_{i4}]$. Then, after symbol-group spreading, the four symbols become 4×3 symbols, $X_1S_{i1,1}$, $X_1S_{i1,2}$, $X_1S_{i1,3}$, $X_2S_{i2,2}$, $X_2S_{i2,3}$, $X_3S_{i3,1}$, $X_3S_{i3,2}$, $X_3S_{i3,3}$, $X_4S_{i4,1}$, $X_4S_{i4,2}$, $X_4S_{i4,3}$, and the total number of spreading sequence patterns is $3^4=81$.

Case 3: Spreading Length=4

In some embodiments, and prior to spreading, four (L=4) arbitrary orthogonal sequences may be generated. In an example, the orthogonal sequences are given by:

| Sequence element, $S_{j,k}$ | k = 1 | k = 2 | k = 3 | k = 4 |
|---|---|---|---|---|
| j = 1 | 1 | 0.707 + 0.707i | −1 | 0.707 + 0.707i |
| j = 2 | 0.707 + 0.707i | 1 | 0.707 + 0.707i | −1 |
| j = 3 | −1 | 0.707 + 0.707i | 1 | 0.707 + 0.707i |
| j = 4 | 0.707 + 0.707i | −1 | 0.707 + 0.707i | 1 |

1) Symbol-Group Length=2

Suppose two symbols $X_1$ and $X_2$ are in a group, and each symbol has four choices for the spreading sequence, $[S_{i1}, S_{i2}]$. Then, after symbol-group spreading, the two symbols become 2×4 symbols, $X_1S_{i1,1}$, $X_1S_{i1,2}$, $X_1S_{i1,3}$, $X_1S_{i1,4}$, $X_2S_{i2,2}$, $X_2S_{i2,3}$, $X_2S_{i2,4}$, and the total number of spreading sequence patterns is $4^2=16$.

2) Symbol-Group Length=3

Suppose three symbols $X_1$, $X_2$ and $X_3$ are in a group, and each symbol has four choices for the spreading sequence, $[S_{i1}, S_{i2}, S_{i3}]$. Then, after symbol-group spreading, the three symbols become 3×4 symbols, $X_1S_{i1,1}$, $X_1S_{i1,2}$, $X_1S_{i1,3}$, $X_1S_{i1,4}$, $X_2S_{i2,1}$, $X_2S_{i2,2}$, $X_2S_{i2,3}$, $X_2S_{i2,4}$, $X_3S_{i3,1}$, $X_3S_{i3,2}$, $X_3S_{i3,3}$, $X_3S_{i3,4}$, and the total number of spreading sequence patterns is $4^3=64$.

In some embodiments, different signaling methods may be used to provide an indication of the values of one or more parameters (e.g., spreading length, symbol-group length) and which sequences to be used in those cases. The different signaling methods include:

UE-Specific Signaling Message

Figure 6A:
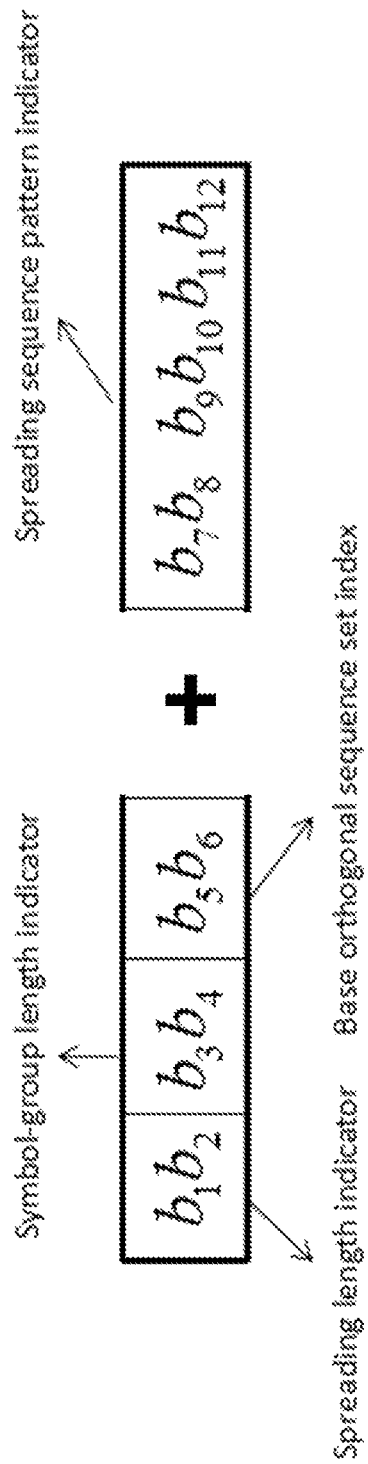
FIGS. 6A and 6B show examples of signaling message for symbol-group based spreading, in accordance with some embodiments of the presently disclosed technology.

In some embodiments, the spreading length, symbol-group length, base orthogonal sequence set index and spreading sequence patterns are all pre-configured. FIG. 6A shows an example of the signaling that may be used for a UE-specific signaling message. As shown therein, bits $b_1b_2$ are used to indicate the spreading length (e.g., 4) and at least 2 bits are needed. Similarly, $b_3b_4$ are used to indicate the symbol-group length (e.g., 3), and at least 2 bits are needed. If it is assumed that there are no more than 4 kinds of base orthogonal sequence sets, like identity matrix, Hadamard matrix and so on, then bits $b_5b_6$ are used to indicate the type of base orthogonal sequence set. This first component of 6-bits is terminal-specific and enables the UE to set up a specific set of sequences. In the symbol-group, each symbol has 4 choices and there are 3 symbols in the group, and thus, 6 bits $b_7b_8b_9b_{10}\,b_{11}\,b_{12}$ are needed to indicate spreading sequence patterns. This second terminal-specific component enables the UE to select specific sequences from the pool of sequences created using the first 6 bits. In all, 12 bits are needed for a UE-specific signaling message in the example shown in FIG. 6A. In other words, the base station (or network node, or gNB) sends 12 bits to a specific terminal to configure the sequences used by that terminal.

Pool-Based Signaling Message

Figure 6B:
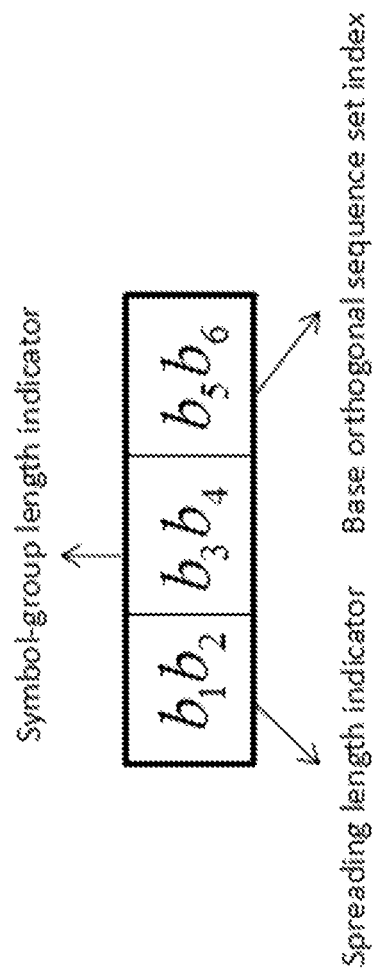

In some embodiments, the spreading length, symbol-group length and base orthogonal sequence set index are per-configured, which determines a unique sequence pool. The UE then randomly selects the spreading sequence pattern. FIG. 6B shows an example of the signaling that may be used for a pool-based signaling message. As shown therein, bits $b_1b_2$ are used to indicate the spreading length (e.g., 4) and at least 2 bits are needed. Similarly, $b_3b_4$ are used to indicate the symbol-group length (e.g., 3), and at least 2 bits are needed. If it is assumed that there are no more than 4 kinds of base orthogonal sequence sets, like in the previous example, then bits $b_5b_6$ are used to indicate the type of base orthogonal sequence set. In all, 6 bits are needed for a pool-based signaling message in the example shown in FIG. 6B. In other words, the base station broadcasts 6 bits to all the UEs in the cell being served by that base station, thereby enabling the UEs to establish a common pool of sequences, from which each UE randomly selects the sequences that it can then use.

Hybrid Signaling Message

In some embodiments, a signaling message that uses a pool-based component and a terminal-specific component may be used based on the configuration shown in FIG. 6A. Herein, the base station broadcasts bits $b_1 \ldots b_6$ (the pool-based component), which allows all the UEs (or terminals) in that cell to establish a common pool of sequences. The remaining bits $b_7 \ldots b_{12}$ are transmitted to specific terminals to configure those terminals to use specific sequences. In other embodiments, any terminal that does not receive the last 6 bits, will randomly choose sequences from the pool established using the first 6 bits.

In some embodiments, the one or more of the spreading length, symbol-group length or base orthogonal sequence set may be indicated by other reference signals (RSs). In these cases, the signaling overhead of symbol-group based spreading will be further reduced.

Exemplary Methods for the Disclosed Technology

Embodiments of the disclosed technology use an expanded spreading sequence pattern that is obtained using a base orthogonal spreading sequence set (with relatively small size) and the length the of symbol-group. In an example, using orthogonal base sequences, NOMA spreading sequence patterns with extendable pool size can be flexibly generated or configured by adjusting the number of symbols in the group.

Embodiments of the disclosed technology advantageously (1) minimize the impact on the standardization process compared to the from-scratch NOMA sequence design since the base sequences are orthogonal, (2) flexibly generate or configure the scalable number of NOMA sequence patterns by adjusting the symbols in the group, and (3) control the multi-user interference by adjusting the spreading factor and the number of symbols in the group.

Some exemplary methods for designing symbol-group based spreading schemes include (1) determining the size of base orthogonal spreading sequence set based on the spreading length, (2) choosing one base orthogonal spreading sequence set, and (3) grouping the symbols. That is, each symbol in the group selects a sequence in the base orthogonal spreading sequence set, then sequences selected by all the symbols in one group constitute a spreading sequence pattern. In some embodiments, and for a specific UE, the spreading sequence pattern of different symbol groups is identical. In other embodiments, and for different UEs, the spreading sequence patterns are different and constitute non-orthogonal spreading patterns. In yet other embodiments, and for different UEs, the symbol group length can be the same or different.

Figure 7:
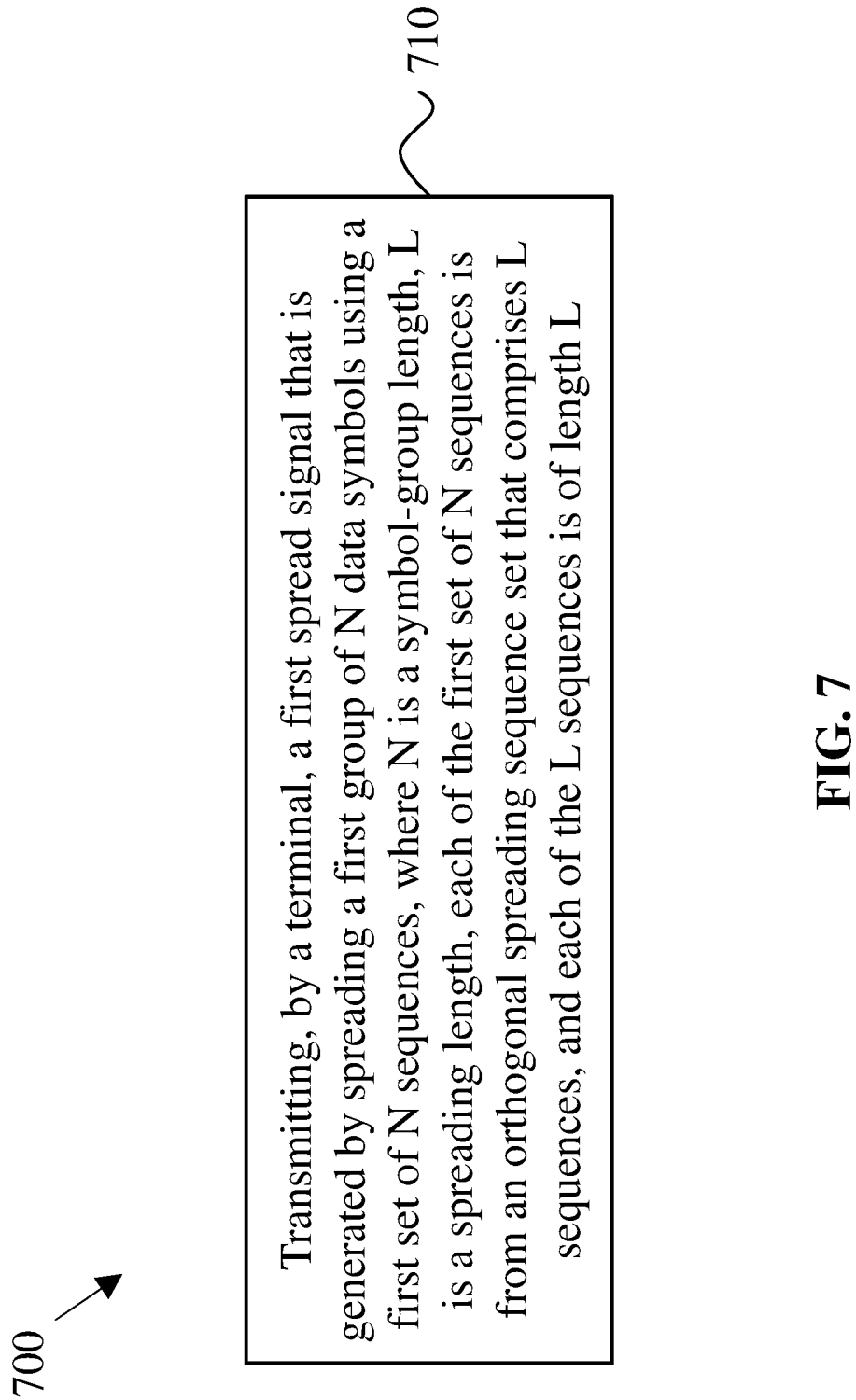
FIG. 7 shows an example of a wireless communication method.

FIG. 7 shows an example of a wireless communication method 700 for symbol-group based spreading schemes. The method 700 includes, at step 710, transmitting, by a terminal, a first spread signal that is generated by spreading a first group of N data symbols using a first set of N sequences, where N is a symbol-group length, L is a spreading length, each of the first set of N sequences is from an orthogonal spreading sequence set that comprises L sequences, and each of the L sequences is of length L.

In some embodiments, and as described in the context of FIG. 6B, the symbol-group length, the spreading length and an index of the orthogonal spreading sequence set are communicated in a pool-based signaling message, and each of the first set of N sequences is randomly selected from the orthogonal spreading sequence set. Herein, all the terminals (or UEs) in the same cell randomly selected sequences from the same pool of sequences.

In some embodiments, and as described in the context of FIG. 6A, the symbol-group length, the spreading length and an index of the orthogonal spreading sequence set are communicated in a first signaling message, and the first set of N sequences is selected based on a spreading sequence pattern indicator in a second signaling message. In an example, the first signaling message and the second signaling message are terminal-specific. In another example, the first signaling message is pool-based, and the second signaling message is terminal-specific.

In some embodiments, the method 700 further includes the step of transmitting a second spread signal that is generated by spreading a second group of N data symbols using the first set of N sequences. In other words, a specific UE (or terminal) will use the same selected set of sequences for its transmissions (until it is reconfigured or reset).

Figure 8:
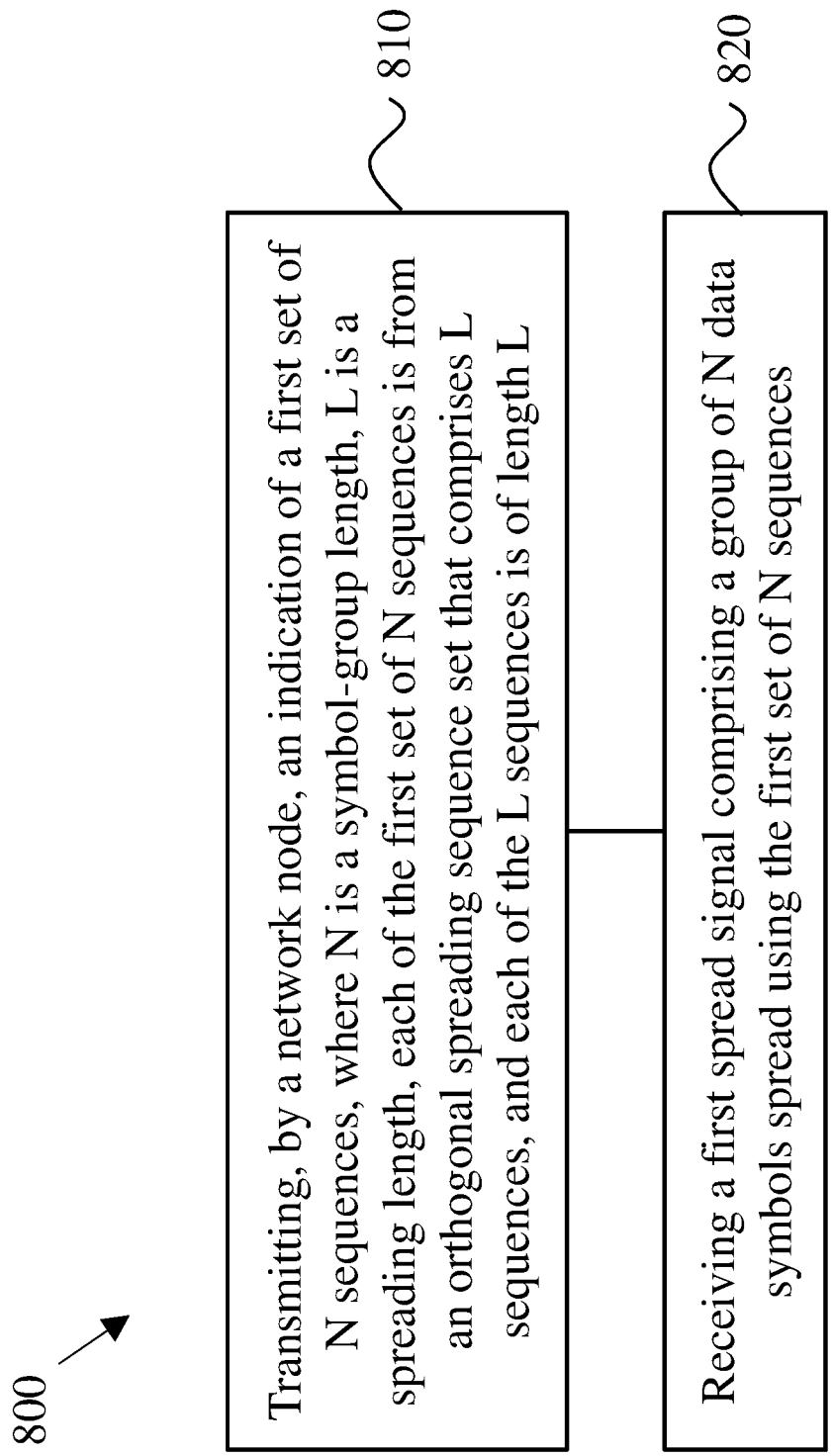
FIG. 8 shows an example of another wireless communication method.

FIG. 8 shows an example of another wireless communication method 800 for symbol-group based spreading schemes. This example includes some features and/or steps that are similar to those shown in FIG. 7, and described above. At least some of these features and/or components may not be separately described in this section.

The method 800 includes, at step 810, transmitting, by a network node, an indication of a first set of N sequences, where N is a symbol-group length, L is a spreading length, each of the first set of N sequences is from an orthogonal spreading sequence set that comprises L sequences, and each of the L sequences is of length L.

The method 800 includes, at step 820, receiving a first spread signal comprising a group of N data symbols spread using the first set of N sequences.

Figure 9:
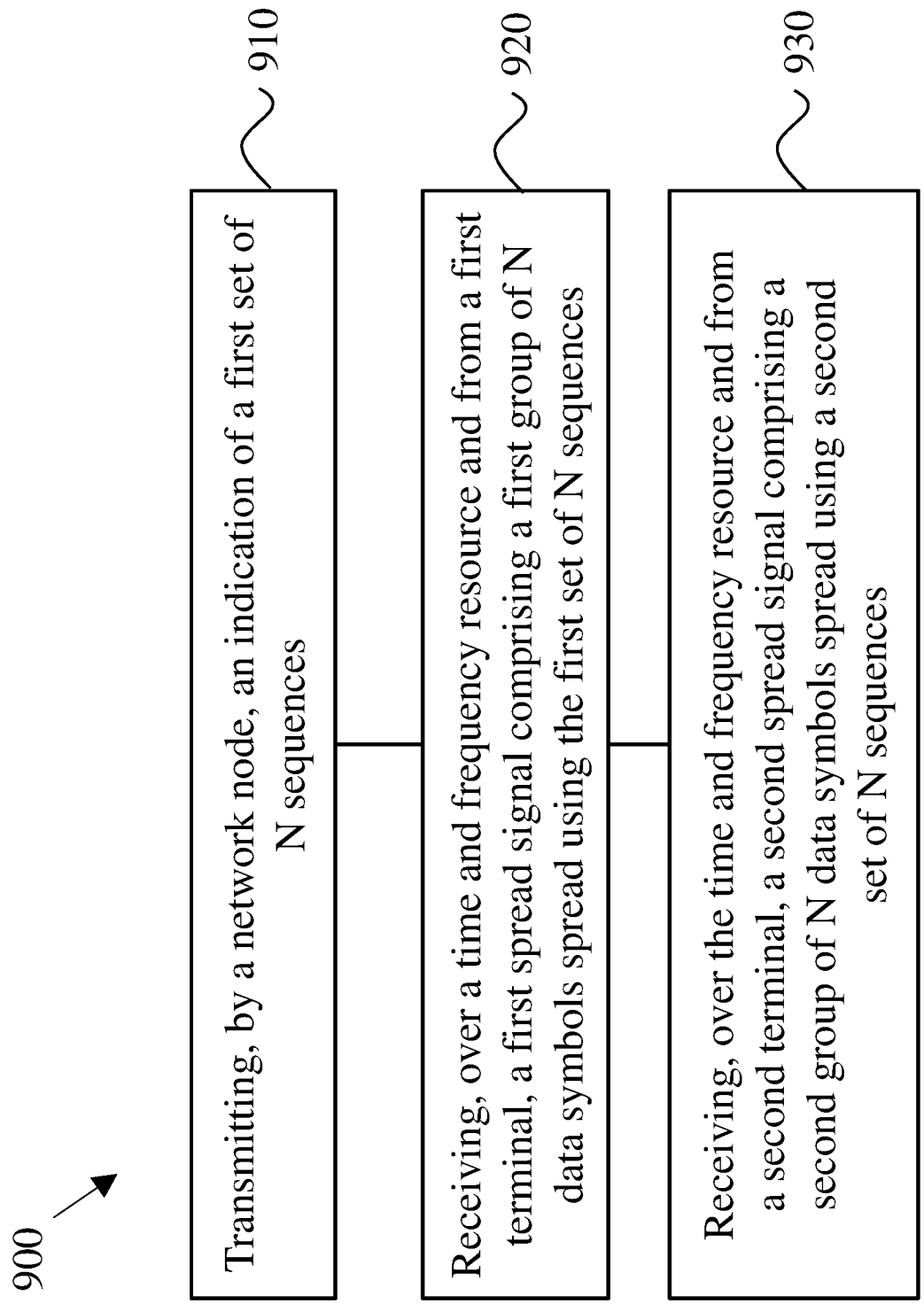
FIG. 9 shows an example of yet another wireless communication method.

FIG. 9 shows an example of yet another wireless communication method 900 for symbol-group based spreading schemes. This example includes some features and/or steps that are similar to those shown in FIGS. 7 and 8, and described above. At least some of these features and/or components may not be separately described in this section.

The method 900 includes, at step 910, transmitting, by a network node, an indication of a first set of N sequences, where N is a symbol-group length, L is a spreading length, each of the first set of N sequences is from an orthogonal spreading sequence set that comprises L sequences, and each of the L sequences is of length L.

The method 900 includes, at step 920, receiving, over a time and frequency resource and from a first terminal, a first spread signal comprising a first group of N data symbols spread using the first set of N sequences.

The method 900 includes, at step 930, receiving, over the time and frequency resource and from a second terminal, a second spread signal comprising a second group of N data symbols spread using a second set of N sequences.

In some embodiments, the method 900 further includes the step of transmitting an indication of the second set of N sequences, which are also from the orthogonal spreading sequence set.

In some embodiments, and as described in the present document, the L sequences of the orthogonal spreading sequence set may be constructed in different ways. In an example, the L sequences correspond to rows of an L×L Hadamard matrix. In another example, the L sequences correspond to rows of an L×L identity matrix. In yet another example, each of the L sequences is a cyclically shifted version of a length-L constant amplitude zero autocorrelation (CAZAC) sequence; e.g. the Zadoff-Chu sequences are a specific type of CAZAC sequences.

In some embodiments, the first spread signal is one of a plurality of spread signals, and a size of the plurality of spread signals is $L^N$. In other embodiments, the spreading length is based on at least one of a code rate, a frame size or a number of terminals.

The specific examples of symbol-group based spreading schemes for different spreading lengths (L) and different symbol-group lengths (N) are illustrative and presented to aid understanding of embodiments of the disclosed technology, and are not to be construed to be limited to the examples presented.

These examples include an example where the spreading length is two (L=2) and an exemplary orthogonal spreading sequence set is based on a following table:

| Sequence element, $S_{i,j}$ | j = 1 | j = 2 |
|---|---|---|
| i = 1 | 1 | 1 |
| i = 2 | 1 | −1 |

Herein, $[S_{1,1}\ S_{1,2}]$ corresponds to a first sequence and $[S_{2,1}\ S_{2,2}]$ corresponds to a second sequence of the orthogonal spreading sequence set.

In an example, and for L=2, the symbol-group length may be two (N=2), where the first group of N data symbols comprises symbols $X_1$ and $X_2$, the first spread signal comprises symbols $X_1S_{i1,1}$, $X_1S_{i1,2}$, $X_2S_{i2,1}$ and $X_2S_{i2,2}$, 1≤i1≤2 is an integer and 1≤i2≤2 is an integer.

In another example, and for L=2, the symbol-group length may be three (N=3), where the first group of N data symbols comprises symbols $X_1$, $X_2$ and $X_3$, the first spread signal comprises symbols $X_1S_{i1,1}$, $X_1S_{i1,2}$, $X_2S_{i2,1}$, $X_2S_{i2,2}$, $X_3S_{i3,1}$, and $X_3S_{i3,2}$, 1≤i1≤2 is an integer, 1≤i2≤2 is an integer and 1≤i3≤2 is an integer.

In yet another example, and for L=2, the symbol-group length is four (N=4), where the first group of N data symbols comprises symbols $X_1$, $X_2$, $X_3$ and $X_4$, the first spread signal comprises symbols $X_1S_{i1,1}$, $X_1S_{i1,2}$, $X_2S_{i2,1}$, $X_2S_{i2,2}$, $X_3S_{i3,1}$, $X_3S_{i3,2}$, $X_4S_{i4,1}$, and $X_4S_{i4,2}$, 1≤i1≤2 is an integer, 1≤i2≤2 is an integer, 1≤i3≤2 is an integer and 1≤i4≤2 is an integer.

These examples include an example where the spreading length is three (L=3) and an exemplary orthogonal spreading sequence set is based on a following table:

| Sequence element, $S_{i,j}$ | j = 1 | j = 2 | j = 3 |
|---|---|---|---|
| i = 1 | 1 | 0 | 0 |
| i = 2 | 0 | 1 | 0 |
| i = 3 | 0 | 0 | 1 |

Herein, $[S_{1,1}\ S_{1,2}\ S_{1,3}]$ corresponds to a first sequence, $[S_{2,1}\ S_{2,2}\ S_{2,3}]$ corresponds to a second sequence, and $[S_{3,1}\ S_{3,2}\ S_{3,3}]$ corresponds to a third sequence of the orthogonal spreading sequence set.

These examples include an example where the spreading length is four (L=4) and an exemplary orthogonal spreading sequence set is based on a following table:

| Sequence element, $S_{j,k}$ | k = 1 | k = 2 | k = 3 | k = 4 |
|---|---|---|---|---|
| j = 1 | 1 | 0.707 + 0.707i | −1 | 0.707 + 0.707i |
| j = 2 | 0.707 + 0.707i | 1 | 0.707 + 0.707i | −1 |
| j = 3 | −1 | 0.707 + 0.707i | 1 | 0.707 + 0.707i |
| j = 4 | 0.707 + 0.707i | −1 | 0.707 + 0.707i | 1 |

Herein, $[S_{1,1}\ S_{1,2}\ S_{1,3}\ S_{1,4}]$ corresponds to a first sequence, $[S_{2,1}\ S_{2,2}\ S_{2,3}\ S_{2,4}]$ corresponds to a second sequence, $[S_{3,1}\ S_{3,2}\ S_{3,3}\ S_{3,4}]$ corresponds to a third sequence, $[S_{4,1}\ S_{4,2}\ S_{4,3}\ S_{4,4}]$ corresponds to a fourth sequence of the orthogonal spreading sequence set, and i is an imaginary unit value equal to $\sqrt{-1}$.

Implementations for the Disclosed Technology

Figure 10:
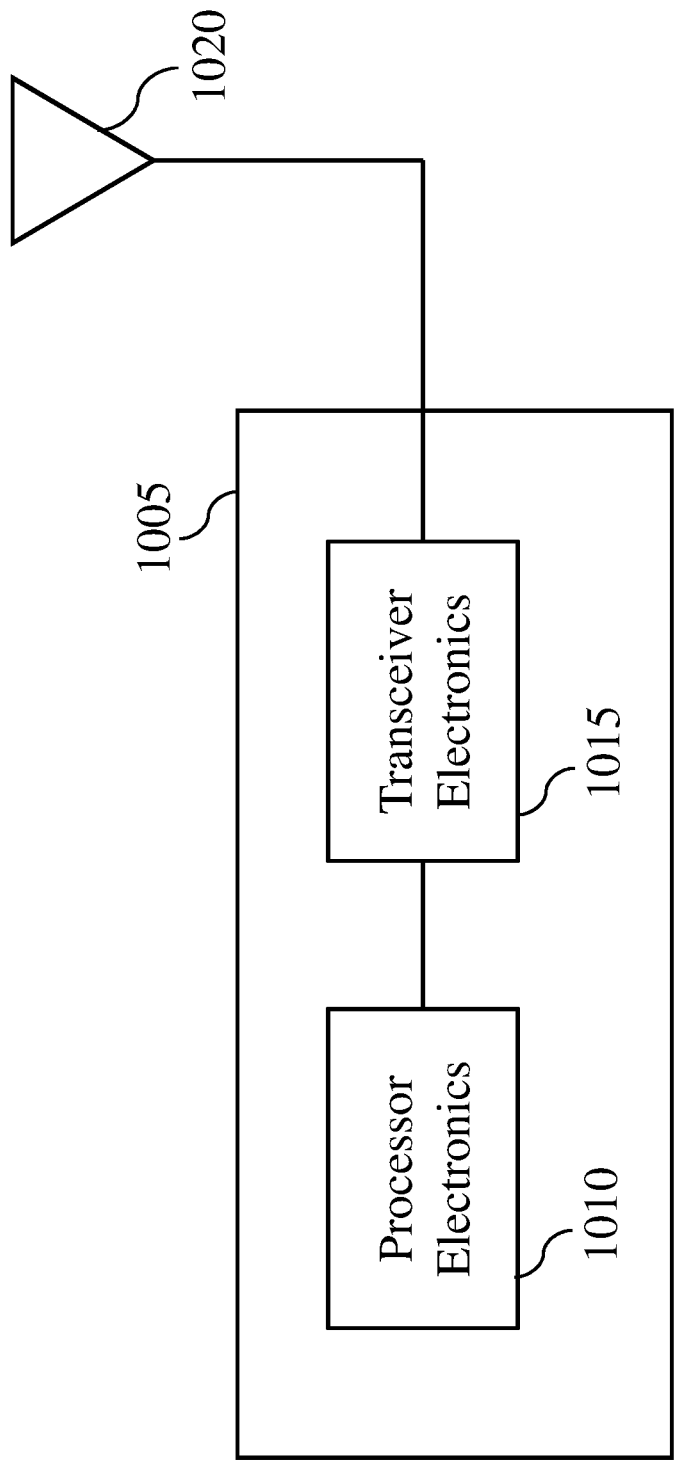
FIG. 10 is a block diagram representation of a portion of an apparatus, in accordance with some embodiments of the presently disclosed technology.

FIG. 10 is a block diagram representation of a portion of an apparatus, in accordance with some embodiments of the presently disclosed technology. An apparatus 1005, such as a base station or a wireless device (or UE), can include processor electronics 1010 such as a microprocessor that implements one or more of the techniques presented in this document. The apparatus 1005 can include transceiver electronics 1015 to send and/or receive wireless signals over one or more communication interfaces such as antenna(s) 1020. The apparatus 1005 can include other communication interfaces for transmitting and receiving data. Apparatus 1005 can include one or more memories (not explicitly shown) configured to store information such as data and/or instructions. In some implementations, the processor electronics 1010 can include at least a portion of the transceiver electronics 1015. In some embodiments, at least some of the disclosed techniques, modules or functions are implemented using the apparatus 1005.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
transmitting, by a terminal, a first spread signal that is generated by spreading a first group of N data symbols using a first set of N sequences,
wherein N is a symbol-group length, wherein each of the first set of N sequences is from an orthogonal spreading sequence set that comprises L sequences, wherein L is a spreading length, and wherein each of the L sequences is of length L,
wherein the symbol-group length, the spreading length and an index of the orthogonal spreading sequence set are received in a first signaling message, and
wherein the first set of N sequences is selected based on a spreading sequence pattern indicator in a second signaling message received by the terminal.

2. The method of claim 1, wherein each of the first set of N sequences is randomly selected from the orthogonal spreading sequence set.

3. The method of claim 1, wherein the L sequences correspond to rows of an L×L Hadamard matrix.

4. The method of claim 1, wherein the L sequences correspond to rows of an L×L identity matrix.

5. The method of claim 1, wherein each of the L sequences is a cyclically shifted version of a length-L constant amplitude zero autocorrelation (CAZAC) sequence.

6. The method of claim 1, wherein the first spread signal is one of a plurality of spread signals, and wherein a size of the plurality of spread signals is $L^N$.

7. A method for wireless communication, comprising:
transmitting, by a network node, an indication of a first set of N sequences, wherein each of the first set of N sequences is from an orthogonal spreading sequence set that comprises L sequences, wherein L is a spreading length, wherein N is a symbol-group length, and wherein each of the L sequences is of length L;
transmitting, by the network node to a first terminal, the symbol-group length, the spreading length and an index of the orthogonal spreading sequence set in a first signaling message;
transmitting, by the network node to the first terminal, a spreading sequence pattern indicator in a second signaling message, wherein a selection of the first set of N sequences is based on the spreading sequence pattern indicator;
receiving, over a time and frequency resource and from the first terminal, a first spread signal comprising a first group of N data symbols spread using the first set of N sequences; and
receiving, over the time and frequency resource and from a second terminal, a second spread signal comprising a second group of N data symbols spread using a second set of N sequences.

8. The method of claim 7, further comprising:
transmitting, by the network node, an indication of the second set of N sequences, wherein each of the second set of N sequences is from the orthogonal spreading sequence set.

9. The method of claim 7, wherein the spreading length is two (L=2), and wherein the orthogonal spreading sequence set is based on a following table:

| Sequence element, $S_{i,j}$ | j = 1 | j = 2 |
| --- | --- | --- |
| i = 1 | 1 | 1 |
| i = 2 | 1 | −1 | wherein [$S_{1,1}$ $S_{1,2}$] corresponds to a first sequence of the orthogonal spreading sequence set, and wherein [$S_{2,1}$ $S_{2,2}$] corresponds to a second sequence of the orthogonal spreading sequence set.

10. The method of claim 9, wherein the symbol-group length is two (N=2), wherein the first group of N data symbols comprises symbols $X_1$ and $X_2$, wherein the first spread signal comprises symbols $X_1 S_{i1,1}$, $X_1 S_{i1,2}$, $X_2 S_{i2,1}$ and $X_2 S_{i2,2}$, and wherein $1 \leq i1 \leq 2$ is an integer and $1 \leq i2 \leq 2$ is an integer.

11. The method of claim 7, wherein the spreading length is four (L=4), and wherein the orthogonal spreading sequence set is based on a following table:

| Sequence element, $S_{j,k}$ | k = 1 | k = 2 | k = 3 | k = 4 |
|---|---|---|---|---|
| j = 1 | 1 | 0.707 + 0.707i | −1 | 0.707 + 0.707i |
| j = 2 | 0.707 + 0.707i | 1 | 0.707 + 0.707i | −1 |
| j = 3 | −1 | 0.707 + 0.707i | 1 | 0.707 + 0.707i |
| j = 4 | 0.707 + 0.707i | −1 | 0.707 + 0.707i | 1 | wherein [$S_{1,1}$ $S_{1,2}$ $S_{1,3}$ $S_{1,4}$] corresponds to a first sequence of the orthogonal spreading sequence set, wherein [$S_{2,1}$ $S_{2,2}$ $S_{2,3}$ $S_{2,4}$] corresponds to a second sequence of the orthogonal spreading sequence set, wherein [$S_{3,1}$ $S_{3,2}$ $S_{3,3}$ $S_{3,4}$] corresponds to a third sequence of the orthogonal spreading sequence set, wherein [$S_{4,1}$ $S_{4,2}$ $S_{4,3}$ $S_{4,4}$] corresponds to a fourth sequence of the orthogonal spreading sequence set, and wherein i is an imaginary unit value equal to $\sqrt{-1}$.

12. A wireless communications apparatus for wireless communication comprising a processor, wherein the processor is configured to:
transmit, by a terminal, a first spread signal that is generated by spreading a first group of N data symbols using a first set of N sequences,
wherein N is a symbol-group length, wherein each of the first set of N sequences is from an orthogonal spreading sequence set that comprises L sequences, wherein L is a spreading length, and wherein each of the L sequences is of length L,
wherein the symbol-group length, the spreading length and an index of the orthogonal spreading sequence set are received in a first signaling message, and
wherein the first set of N sequences is selected based on a spreading sequence pattern indicator in a second signaling message received by the terminal.

13. The wireless communications apparatus of claim 12, wherein each of the first set of N sequences is randomly selected from the orthogonal spreading sequence set.

14. The wireless communications apparatus of claim 12, wherein the L sequences correspond to rows of an L×L Hadamard matrix.

15. The wireless communications apparatus of claim 12, wherein the L sequences correspond to rows of an L×L identity matrix.

16. The wireless communications apparatus of claim 12, wherein each of the L sequences is a cyclically shifted version of a length-L constant amplitude zero autocorrelation (CAZAC) sequence.

17. A wireless communications apparatus for wireless communication comprising a processor, wherein the processor is configured to:
transmit, by a network node, an indication of a first set of N sequences, wherein each of the first set of N sequences is from an orthogonal spreading sequence set that comprises L sequences, wherein L is a spreading length, wherein N is a symbol-group length, and wherein each of the L sequences is of length L;
transmit, by the network node to a first terminal, the symbol-group length, the spreading length and an index of the orthogonal spreading sequence set in a first signaling message;
transmit, by the network node to the first terminal, a spreading sequence pattern indicator in a second signaling message, wherein a selection of the first set of N sequences is based on the spreading sequence pattern indicator;
receive, over a time and frequency resource and from the first terminal, a first spread signal comprising a first group of N data symbols spread using the first set of N sequences; and
receive, over the time and frequency resource and from a second terminal, a second spread signal comprising a second group of N data symbols spread using a second set of N sequences.

18. The wireless communications apparatus of claim 17, wherein the spreading length is four (L=4), and wherein the orthogonal spreading sequence set is based on a following table:

| Sequence element, $S_{j,k}$ | k = 1 | k = 2 | k = 3 | k = 4 |
|---|---|---|---|---|
| j = 1 | 1 | 0.707 + 0.707i | −1 | 0.707 + 0.707i |
| j = 2 | 0.707 + 0.707i | 1 | 0.707 + 0.707i | −1 |
| j = 3 | −1 | 0.707 + 0.707i | 1 | 0.707 + 0.707i |
| j = 4 | 0.707 + 0.707i | −1 | 0.707 + 0.707i | 1 | wherein [$S_{1,1}$ $S_{1,2}$ $S_{1,3}$ $S_{1,4}$] corresponds to a first sequence of the orthogonal spreading sequence set, wherein [$S_{2,1}$ $S_{2,2}$ $S_{2,3}$ $S_{2,4}$] corresponds to a second sequence of the orthogonal spreading sequence set, wherein [$S_{3,1}$ $S_{3,2}$ $S_{3,3}$ $S_{3,4}$] corresponds to a third sequence of the orthogonal spreading sequence set, wherein [$S_{4,1}$ $S_{4,2}$ $S_{4,3}$ $S_{4,4}$] corresponds to a fourth sequence of the orthogonal spreading sequence set, and wherein i is an imaginary unit value equal to $\sqrt{-1}$.

19. The wireless communication apparatus of claim 17, wherein the processor is further configured to:
transmit, by the network node, an indication of the second set of N sequences, wherein each of the second set of N sequences is from the orthogonal spreading sequence set.

20. The wireless communication apparatus of claim 17, wherein the spreading length is two (L=2), and wherein the orthogonal spreading sequence set is based on a following table:

| Sequence element, $S_{i,j}$ | j = 1 | j = 2 |
|---|---|---|
| i = 1 | 1 | 1 |
| i = 2 | 1 | −1 | wherein $[S_{1,1}\ S_{1,2}]$ corresponds to a first sequence of the orthogonal spreading sequence set, and wherein $[S_{2,1}\ S_{2,2}]$ corresponds to a second sequence of the orthogonal spreading sequence set.

\* \* \* \* \*

UNITED STATES PATENT AND TRADEMARK OFFICE
CERTIFICATE OF CORRECTION

PATENT NO. : 11,637,583 B2
APPLICATION NO. : 17/306609
DATED : April 25, 2023
INVENTOR(S) : Ziyang Li et al.

It is certified that error appears in the above-identified patent and that said Letters Patent is hereby corrected as shown below:

On the Title Page

Page 2, in item (56), under "OTHER PUBLICATIONS", in Column 2, Line 9, delete "NoMA,"" and insert -- NOMA," --

Page 2, in item (56), under "OTHER PUBLICATIONS", in Column 2, Line 11, delete "NoMA,"" and insert -- NOMA," --

In the Specification

Column 2, Line 51, delete "require" and insert -- required --

Column 5, Line 28, delete "$X_2S_{i2,2}$," and insert -- $X_2S_{i2,1}$, $X_2S_{i2,2}$, --

Column 5, Line 36, delete "$X_2S_{i2,2}$," and insert -- $X_2S_{i2,1}$, $X_2S_{i2,2}$, --

Column 5, Line 37, delete "3ˆ9" and insert -- 3^3 --

Column 6, Line 6, delete "$X_2S_{i2,2}$," and insert -- $X_2S_{i2,1}$, $X_2S_{i2,2}$, --

Column 6, Line 31, delete "$X_2S_{i2,2}$," and insert -- $X_2S_{i2,1}$, $X_2S_{i2,2}$, --

Column 6, Line 62, delete "$b_7b_8b_9b_{10}\ b_{11}\ b_{12}$" and insert -- $b_7b_8b_9b_{10}b_{11}b_{12}$ --

In the Claims

Column 14, Line 61, in Claim 19, delete "communication" and insert -- communications --

Column 15, Line 1, in Claim 20, delete "communication" and insert -- communications --

Signed and Sealed this
Eighteenth Day of July, 2023

Katherine Kelly Vidal
*Director of the United States Patent and Trademark Office*